United States Patent [19]

Tanaka et al.

[11] Patent Number: 4,852,074

[45] Date of Patent: Jul. 25, 1989

[54] METHOD OF MEASUREMENT OF CROSSTALK NOISE IN PLAYBACK INFORMATION SIGNAL

[75] Inventors: Hozumi Tanaka; Hiroshi Aoyama; Nobuyoshi Kuroda; Takumi Ito, all of Tokorozawa, Japan

[73] Assignee: Pioneer Electronic Corporation, Tokyo, Japan

[21] Appl. No.: 80,077

[22] Filed: Jul. 31, 1987

[30] Foreign Application Priority Data

Aug. 1, 1986 [JP] Japan .............................. 61-182500

[51] Int. Cl.$^4$ .............................................. G11B 7/00
[52] U.S. Cl. ...................................... 369/53; 358/328
[58] Field of Search ................ 358/328, 336; 369/54; 360/31

[56] References Cited

U.S. PATENT DOCUMENTS

| | | | |
|---|---|---|---|
| 4,012,771 | 3/1977 | Ishigaki et al. | 358/329 X |
| 4,141,048 | 2/1979 | Kubota et al. | 360/107 X |
| 4,413,288 | 11/1983 | Hurst | 360/31 |
| 4,491,877 | 1/1985 | Kanamaru | 358/336 |
| 4,549,226 | 10/1985 | Tonita | 358/328 |
| 4,712,204 | 12/1987 | Takemura et al. | 369/111 X |

Primary Examiner—William L. Sikes
Assistant Examiner—Akm E. Ullah
Attorney, Agent, or Firm—Foley & Lardner, Schwartz, Jeffery, Schwaab, Mack, Blumenthal & Evans

[57] ABSTRACT

A method of measuring the level of crosstalk noise in a playback signal produced from a recording disk such as a video disk, first and second signals of mutually different frequencies are recorded in respective sections of a track in a periodically alternating sequence. These first and second signals are also recorded in corresponding sections of at least one closely adjacent track in a periodically alternating sequence which is displaced with respect to the first-mentioned sequence. Playback of the first track is then repetitively performed, with switching selection of portions of the playback signal from the first sections and second sections respectively, and a derivation of levels of a beat component produced during these selected playback signal portions is obtained. The levels of the beat component are measured, and represent crosstalk noise levels.

4 Claims, 4 Drawing Sheets

METHOD OF MEASUREMENT OF CROSSTALK NOISE IN PLAYBACK INFORMATION SIGNAL

BACKGROUND OF THE INVENTION

1. Field of the Invention

The present invention relates to a method of measuring crosstalk noise in a playback information signal and in particular to a method of measuring crosstalk noise in a playback information signal derived from a recording disk such as a video disk.

2. Background Information

Generally, each track of a recording disk such as a video disk has recorded thereon one frame (corresponding to one display picture) of a video signal. Crosstalk noises arise from transfer into a desired playback signal (i.e. obtained from a disk recording track which is currently being played) of interfering signals resulting from data recorded on tracks immediately adjacent to that which is being played. A prior art method used to observe and measure such crosstalk noises will be described referring to FIGS. 1 (A) to 1(C). Picture data of the form shown in FIGS. 1(A) to 1(C), i.e. three consecutive frames of a video signal, are respectively recorded on three immediately adjacent recording tracks of the disk to measure the crosstalk noises. The data recorded on the central one of these three tracks is repetitively played back, whereby the display image shown in FIG. 1(D) is produced. Beat interference, indicated by the portions enclosed in broken-line outlines, arises as a result of crosstalk. Measurement of such crosstalk noise has been performed in the prior art by rendering the crosstalk level visible on a CRT display in this way.

However, there are basically two forms of generation of such crosstalk noise, i.e. noise produced by an interference component from a bright portion of the desired image being mixed with a dark portion of the desired image, and noise resulting from a component of a dark portion of the image being mixed with a bright portion of the desired image. With the prior art method of crosstalk noise measurement described above, it is not possible to measure both of these types of crosstalk noise at the same time. Furthermore since this prior art measurement method is dependent upon human vision, substantial amounts of measurement error can arise, since measurement accuracy will largely depend upon the experience of the test operator.

SUMMARY OF THE INVENTION

It is an objective of the present invention to overcome the problems of the prior art measurement method described above, by providing a crosstalk noise measurement method for a playback data signal whereby human eyesight is not utilized and whereby simultaneous measurement can be performed of the crosstalk noises resulting from an interference component from a high brightness portion of an image mixing with a low brightness portion of the image, and crosstalk noises resulting from an interference component from a low brightness portion of the image mixing with a high brightness portion of the image.

To achieve the above objectives, a method of crosstalk noise measurement for a playback data signal according to the present invention comprises:

recording first and second signals of mutually different frequencies upon respective predetermined sections of a first recording track in a first periodically alternating sequence, and recording said first and second signals in sections corresponding to said first track sections on at least one track positioned closely adjacent to said first track, in a second periodically alternating sequence which is displaced in position with respect to said first sequence by a predetermined amount;

executing playback of said first track sections by a playback apparatus to obtain a playback signal and;

measuring said level of crosstalk noises as a level of a beat component produced between said signals of two different frequencies, which is contained in said playback signal.

DETAILED DESCRIPTION OF THE INVENTION

Figure 1:
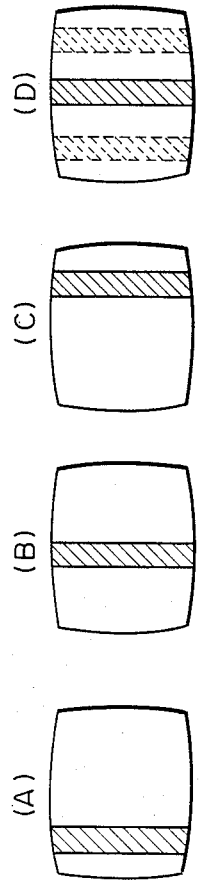
FIG. 1 is a diagram for assistance in describing a prior art method of crosstalk noise measurement.
Figure 2:
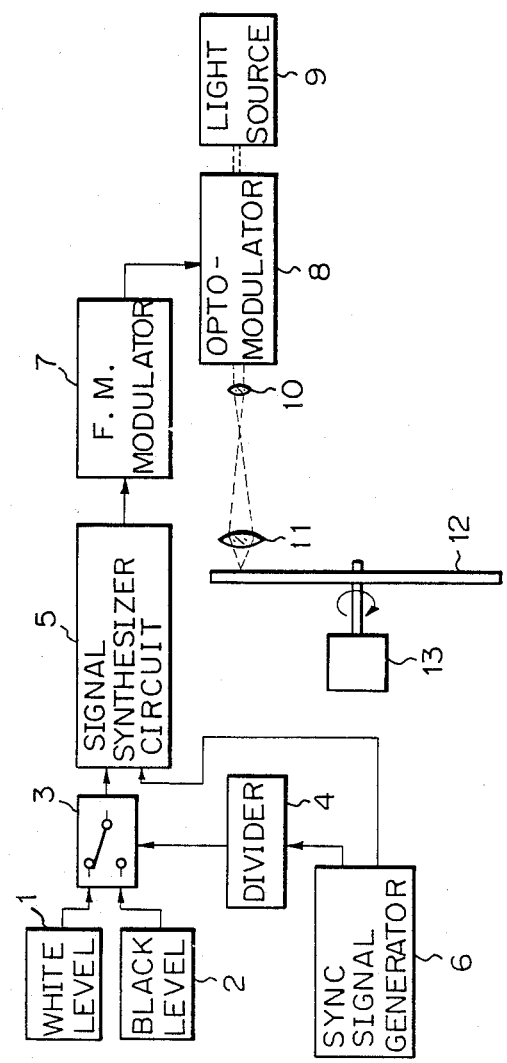
FIG. 2 is a block diagram of an apparatus for recording signals on a recording disk, for use with the measurement method of the present invention.
Figure 3:
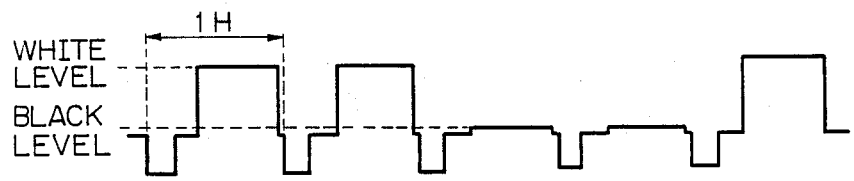
FIG. 3 is a waveform diagram of signals recorded by the apparatus of FIG. 2.
Figure 4:
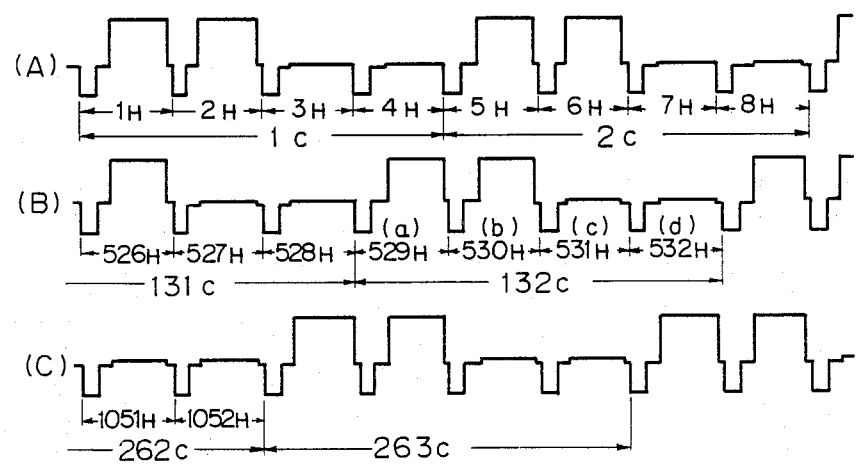
FIGS. 4(A)–(C) are a waveform diagram showing signals which are recorded on three consecutive tracks of a recording disk by the apparatus of FIG. 2.

An embodiment of the present invention will be described referring to FIGS. 2 through 5. In the following, a horizontal scanning interval of a video signal will be designated simply as "H", with one horizontal scanning interval being designated as 1 H, two consecutive intervals as 2 H, and so on. In FIG. 2, numeral 1 denotes a white level generator which produces a signal whose level is identical to the white level of a video signal, while numeral 2 denotes a black level generator which produces a signal whose level is identical to the black level of the video signal. The respective output signals produced by the white level generator 1 and black level generator 2 are supplied to a changeover switch 3, which also receives a control signal produced from a frequency divider 4, which executes frequency division of the horizontal sync signal of the video signal by a factor of 2. The changeover switch 3 is thereby controlled by the control signal from frequency divider 4 to select the white level signal and the black level signal to be alternately output therefrom during successive 2 H intervals (i.e. 2 horizontal scanning intervals). The output signal from changeover switch 3 is supplied to a signal synthesizer circuit 5, which is also supplied with a sync signal consisting of horizontal and vertical sync pulses and an equalizing pulse from the sync signal generator 6. The signal synthesizer circuit 5 thereby synthesizes a video signal from these sync signals and the output signal from changeover switch 3, and this video signal is supplied to a frequency modulator 7 to be converted to an FM signal, i.e. in which video signal portions representing the white level are modulated by a signal of one specific frequency and portions representing the black level are modulated by a signal of a specific different frequency. This FM signal is supplied to an optical modulator 8, for controlling the light transmission factor of optical modulator 8. A light beam produced from a laser light source 9 is subjected to intensity modulation by the optical modulator 8, and is then expanded by a collimator lens 10 and focused by a convergence lens 11 to a spot having a diameter of approximately one micrometer, which is formed upon a recording surface of an original disk 12. This recording surface consists of a material such as photo resist, which is thus exposed to light by the focused spot, to thereby record the FM signal on each of successive tracks of disk 12. The original disk 12 is rotated by a motor 13 at a speed which is controlled by a servo loop (not shown in the drawing) and is synchronized with the vertical sync pulses of the video signal (having a repetition frequency of approximately 30 Hz), and is also displaced radially at a speed of approximately 2 microns per revolution. The convergence lens 11 is controlled to maintain the laser light spot continuously focused on the recording surface of the original disk 12, e.g. by a servo loop. Description of the means for performing this focus control will be omitted, and such means are not shown in the drawing.

The video signal which is thereby synthesized and recorded on the disk consists of a successive alternation of 2 H portions (i.e. two successive horizontal scanning intervals), recorded as an FM signal of specific frequency on two successive sections of a track, which express a brightness corresponding to the white level of the video signal, and 2 H portions recorded as an FM signal of a frequency different from the first-mentioned signal upon a succeeding pair of track sections, corresponding to the black level of that signal. Thus, such pairs of "white level" track sections and "black level" track sections alternately occur with a repetition period of 4 H. One track on the recording disk having this signal recorded thereon will contain one frame interval of the video signal, i.e. 525 horizontal scanning intervals, referred to in the following as 525 H. Thus, of three consecutive tracks on such a disk, the video signal recorded on the first track will correspond to the display picture shown in FIG. 4(A), that recorded on the second one of the three tracks will correspond to the display picture shown in FIG. 4(B), and that recorded on the third one of the three tracks will correspond to the display picture shown in FIG. 4(C). That is to say, the respective starting points of the video signal pattern having a 4 H repetition period as described above, with respect to the starting position of each track, are successively advanced along the time axis by 1 H intervals in successive tracks. In FIG. 4(A) to 4(C), numerals having the suffix "H" respectively indicate the number of an H interval, counting from the first H interval at the start of the three consecutive tracks. The numerals having the suffix "C" respectively indicate the number of periods of alternation between successive pairs of white level H intervals and black level H intervals, counting from the first period of the three consecutive tracks.

In the following, the first 1 H interval of such a 4 H period of alternation will be designated as interval a, and the second, third and fourth respectively designated as b, c and d respectively, which are shown in FIG. 4(B). In this case, crosstalk noises produced during the first (white level) interval a resulting from interference from a black level portion recorded on the preceding immediately adjacent track can be measured. Similarly, crosstalk noises during the second (white level) interval b, resulting from interference by a black level interval recorded on the succeeding immediately adjacent track, can also be measured. Moreover, crosstalk noises during the third (black level) interval c, resulting from interference by a white level interval recorded on the preceding immediately adjacent track, can also be measured, as can crosstalk noises during the fourth (black level) interval d, resulting from interference by a white level interval recorded on the succeeding immediately adjacent track.

An apparatus will now be described referring to FIG. 5, for measurement of crosstalk noise components of data signals recorded on mutually adjacent tracks, during playback of a recording disk which has been recorded with the video signal described above. The playback video signal is applied from an input terminal IN to a DC clamp circuit 20, which sets the pedestal level of the video signal to a predetermined value, i.e. performs DC restoration of the video signal. The output from clamp circuit 20 is applied to a timing pulse generating circuit 21, and to an interference signal detection circuit 22. The timing pulse generating circuit 21 contains a sync separator 23 and a white level detector 24, each of which is coupled to receive the output signal from clamp circuit 20. The sync separator 23 serves to separate the horizontal sync signal from the output signal of clamp circuit 20, and this horizontal sync signal is supplied to the clock terminal of a 4-bit ring counter circuit 25. The white level detector 24 is configured to produce a signal at a specific output level, which in this embodiment is a high logic level, when the instantaneous level of the output video signal from clamp circuit 20 reaches the white level, to thereby produce a positive pulse each time the video signal from the white level detector 24 reaches the white level. These positive pulses from the white level detector 24 are supplied to a 2 H mask circuit 26, which in this embodiment consists of a monostable multivibrator (abbreviated in the following to MMV). The duration of an output pulse produced when this MMV of 2 H mask circuit 26 is triggered is set to a value which is slightly longer than a 1 H interval. While a pulse is being produced from this MMV, i.e. while the output from the MMV is inverted from the normal output level, further triggering is inhibited. Thus, after the MMV has been triggered during a first (white level) interval a, the second interval b will have no effect upon the MMV. The output from this 2 H mask circuit 26 is supplied to RESET input terminal of the ring counter circuit 25. Outputs produced from terminals 1Q and 2Q of ring counter circuit 25 correspond respectively to the least significant bit of the output data of that counter and the second least significant bit. These 1Q and 2Q outputs are supplied respectively to two inputs of an OR gate 27 whose output is applied to the interference signal detection circuit 22. The outputs from terminals 4Q and 3Q of ring counter circuit 25 respectively correspond to the most significant bit of the output data from the counter and to the second most significant bit. These outputs from 4Q and 3Q are applied to the inputs of an OR gate 28, whose output is supplied to the interference signal detection circuit 22.

In the interference signal detection circuit 22, the output signal from the clamp circuit 20 (i.e. the input video signal with the DC level thereof restored) is transferred through switch circuits 29 and 30 respectively to DC cut-off filters 31 and 32 respectively for removal of the DC component of the video signal. The output signals from OR gates 27 and 28 are applied as control signals to the switch circuits 29 and 30, with the switch in each switch circuit being set in the closed state when the corresponding control signal is at the high logic level. The respective outputs from the DC cut-off filters 31 and 32 are supplied to a signal adding circuit 33, whose output is transferred through a BPF (bandpass filter) 34. The BPF 34 serves to separate the beat component contained in the output signal from the signal adding circuit 33, which results from the FM signal that is recorded on a track being currently played back, and an FM signal that is recorded on an immediately adjacent track. This beat component is supplied to an amplifier 35, whose output is supplied to a detector 36 which executes AM detection. The resultant output from detector 36 is transferred through switch circuits 37, 38, 39 and 40 to respective drive circuits 41, 42, 43 and 44. These switch circuits 37 to 40 respectively receive the outputs from terminals 1Q to 4Q of ring counter circuit 25, as control signals. As in the case of switch circuits 29 and 30, each of the switch circuits 37 to 40 is set in a closed state when the corresponding control signal is at the high logic level. The outputs from drive circuits 41 to 44 serve to drive respective meters 45, 46, 47 and 48, in accordance with the output from detector 36.

With this apparatus, output signals are produced from 1Q to 4Q of the 4-bit ring counter circuit 25 during the respective first to fourth intervals a to d of the video signal. During the first and second intervals a and b, switch circuit 29 is closed, whereby beat components are supplied to DC cut-off filter 31 which are determined by the level of crosstalk noises contained in the white level DC portions of intervals a and b. During the third and fourth intervals c and d, switch circuit 30 is closed, whereby beat components are supplied to DC cut-off filter 32 which are determined by the level of crosstalk noises contained in the black level DC portions of intervals c and d. These beat components, with the DC components removed by DC cut-off filters 31 and 32, are supplied to the input of the signal adding circuit 33, to be combined by being added together. The beat component which is superimposed upon the DC white level and the beat component which is superimposed upon the DC black level are respectively supplied to two different DC cut-off filters 31 and 32, in this embodiment. The reason for this is to prevent the occurrence of a step change in the output produced by adding together the beat components after removal of the DC components, i.e. a step change resulting from a difference between the levels of these DC components.

The output from signal adding circuit 33 is supplied through BPF 34 and amplifier 35 to the detector 36, whereby signals are successively output from detector 36 which respectively correspond to the beat components of crosstalk noises during the first to fourth intervals a to d respectively. The switch circuits 37 to 40 which are coupled to receive the outputs thus produced from detector 36 are successively set in the closed state during the first to the fourth intervals a to d respectively, by the output signals from 1Q to 4Q respectively of the 4-bit ring counter circuit 25. Hence, the levels of the beat components of the first to fourth intervals a to d are respectively displayed by meters 45 to 48, as the respective values of crosstalk noises during each of these intervals.

Figure 6:
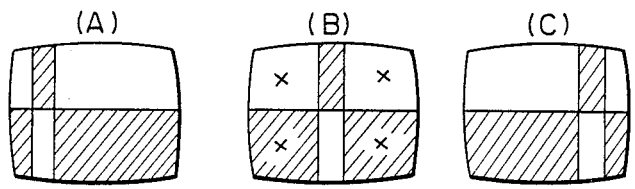
FIG. 6 through FIG. 9 are display representations for assistance in describing embodiments of the present invention.
Figure 7:
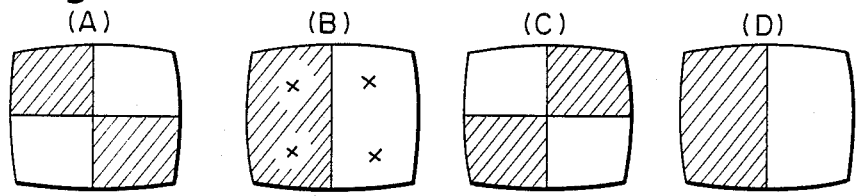
Figure 8:
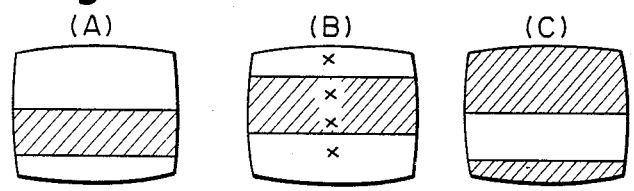
Figure 9:
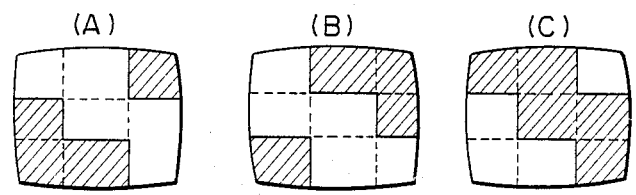

With the embodiment of the present invention described above, video signals are recorded on three successive tracks of a video disk with each signal corresponding to a display picture consisting of a repetitive pattern of alternating pairs of bright (horizontal) lines and pairs of dark lines, with these patterns being successively displaced by one line for successive tracks. However, the invention is not limited to the use of such a video signal pattern, and some other possible embodiments of the invention will be briefly described referring to the display images shown in FIGS. 6 to 9. First, video signals which respectively correspond to the display images shown in FIGS. 6(A) to 6(C) could be recorded on three successive tracks of a video disk. In this case, the level of the beat components representing crosstalk noises can be measured at times corresponding to the display positions indicated by "x" symbols in FIG. 6(B).

Another possible embodiment of the present invention is illustrated in FIGS. 7(A) to 7(D), whereby video signals corresponding to the display pictures shown in FIGS. 7(A) to 7(D) are respectively recorded on 4 successive tracks of a disk, and the levels of the beat components representing crosstalk noises are measured at times corresponding to the positions indicated by the "x" symbols in FIG. 7(B).

Alternatively, it is possible to record video signals corresponding to the display images shown in FIGS. 8(A) to 8(D) on three successive tracks of the disk. In this case, the levels of the beat components are measured at times corresponding to the positions indicated by the "x" symbols in FIG. 8(B).

Yet another embodiment of the method of the present invention is illustrated in FIGS. 9(A) to 9(C) which show video signal contents recorded on three successive tracks of a disk.

In the first embodiment described above, one frame of a video signal is recorded on one track of the disk. However the method is equally applicable to recording of one field of the video signal on one track, or the recording of two frames on one track. In such a case it will be necessary to change the repetition period of successive white level and black level portions of the recorded video signal from the 4 H period used in the described embodiment. Furthermore although with the first embodiment described above, the white level and black level of the video signal are utilized, it would be equally possible to utilize a level which is intermediate between the white level and the black level, together with either the white level or the black level. Moreover, it would be possible to measure crosstalk noises of a chroma signal, by recording a suitable pattern of the chroma signal which is repetitive with a predetermined period, with the described embodiment.

In the embodiment described above, use of the NTSC standard video signal is assumed. However the present invention is equally applicable to the PAL or SECAM standard video signals.

Figure 5:
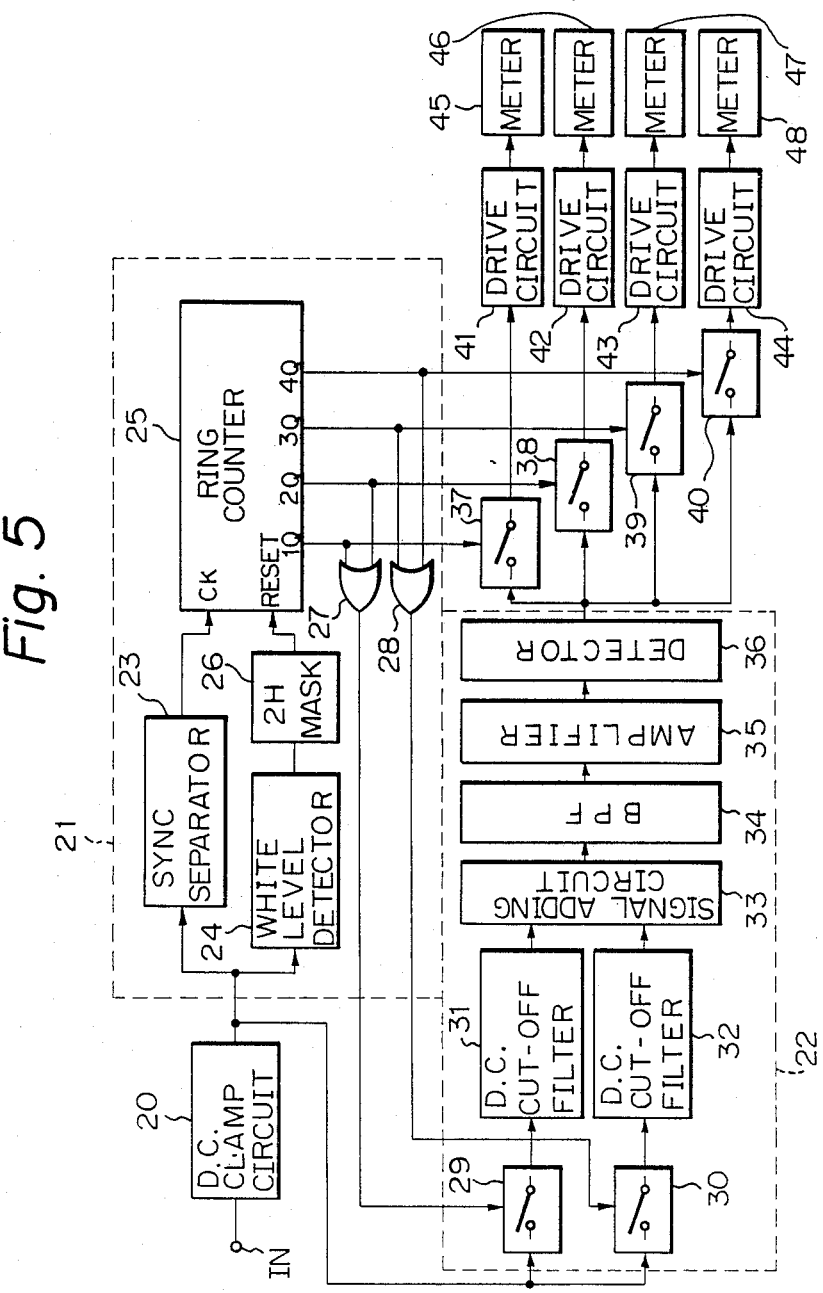
FIG. 5 is a block diagram of an apparatus for measuring crosstalk noises in accordance with the present invention.

It should be noted that instead of the meters 45 to 48 employed in the apparatus of FIG. 5, it would be equally possible to utilize digital display units, or CRT displays. Furthermore with the described embodiment, the crosstalk noise levels for each of the first through fourth intervals a to d are independently displayed. However, it would be equally possible to display the sum of these crosstalk noise levels, or differences between them. It would also be possible to establish predetermined decision values, and to indicate whether the levels of crosstalk noises are acceptable or not by an appropriate display indication, e.g. by displaying "NG" or "OK".

Moreover in the embodiment described above, the switch circuits 37 to 40 are connected to receive the output from interference signal detection circuit 22. However it would be equally possible to connect the respective outputs from switch circuits 37 to 40 in common to the input of interference signal detection circuit 22. Alternatively, the respective outputs from switch circuits 37 to 40 could be connected in common to the input of BPF 34, and hence to amplifier 35 and detector 36 of interference signal detection circuit 22. In this way, so long as the detector 36 is coupled to receive the output from BPF 34, various combinations for interconnecting the interference signal detection circuit 22 with the switch circuits 37 to 40 are possible.

As described hereinabove, a method of measuring crosstalk noises according to the present invention comprises recording one of two signals, which are of respectively different frequencies, upon the first and second of first, second, third, and fourth sections of a first track of a plurality of recording tracks on a recording medium, upon sections corresponding to the first and fourth predetermined sections of a second track positioned immediately adjacent to said first track, and upon sections corresponding to the second and third predetermined sections of a third track immediately adjacent to said first track, and recording the other one of the two signals upon the third and fourth predetermined sections of said first track, upon sections corresponding to the second and third predetermined sections of said second track, and upon sections corresponding to the first and fourth predetermined sections of a third track, and measuring the level of crosstalk noises as a level of a beat component produced between the signals of two different frequencies obtained by playback of the predetermined first through fourth sections by a playback apparatus.

As a result, measurement of crosstalk noises which are components of a high-brightness portion of a display image, resulting from the intermingling of a low-brightness portion of the image with the high-brightness portion, and crosstalk noises which are components of a low-brightness portion of the image, resulting from the intermingling of a high-brightness portion of the image with that low-brightness portion, can be measured at the same time, without the necessity of using human eyesight. Thus with the method of the present invention, it is possible to perform adjustment to optimize the skew of a pickup of an optical type of disk player, by setting the skew with respect to the track direction to be such as to minimize the respective absolute values of the levels of crosstalk noises for each of the first through fourth intervals a to d, and also to optimize the spatial frequency characteristic of the crosstalk noise. In addition, judgement as to the acceptability or non-acceptability of an optical type of video disk player can be made more easily, without the necessity for such judgement to be based upon the experience of the test personnel, such as has been necessary hitherto. Furthermore, crosstalk noise specifications can be clearly and accurately expressed.

What is claimed is:

1. A method of measuring crosstalk noises of a playback data signal by measuring crosstalk noises present as a component of an output from a playback apparatus which executes playback of a signal recorded by frequency modulation on a plurality of recording tracks of a recording medium, comprising:

recording first and second signals of mutually different frequencies upon respective predetermined sections of a first recording track of said recording medium in a first periodically alternating sequence, and recording said first and second signals in sections, corresponding to said first track sections, of at least one track positioned closely adjacent to said first track in a second periodically alternating sequence which is displayed in position with respect to said first sequence by a predetermined amount;

playing back said predetermined first track sections using a playback apparatus to obtain a playback signal and;

measuring a level of crosstalk noises in said playback signal as said level of a beat component contained in said playback signal produced between said first and second signals.

2. The method as set forth in claim 1, in which the frequency of one of said first and second signals represents a white level of a video signal and the frequency of the other one of said first and second signals represents a black level of said video signal.

3. The method as set forth in claim 1, in which the frequency of one of said first and second signals represents a DC level which is intermediate between a white level and a black level of a video signal and the frequency of the other of said first and second signals represents one of a white level and a black level of said video signal.

4. A method of measuring crosstalk noises of a playback data signal by measuring crosstalk noises present as a component of an output from a playback apparatus which executes playback of a signal recorded by frequency modulation on a plurality of recording tracks of a recording medium, comprising;

using said recording medium having at least first, second and third tracks, said second and third tracks being adjacent said first track, said first track having at least first, second, third and fourth sections and said second and third tracks having sections corresponding to said first, second, third and fourth sections of said first track, and using first and second signals of respectively different frequencies, recording said first signal on said first and second sections of said first track of said recording medium, recording said first signal upon said sections of said track corresponding to said first and fourth sections of said first track, recording said first signal upon said sections of said third track corresponding to said second and third sections of said first track;

recording said second signal upon said third and fourth sections of said first track, recording said second signal upon said sections of said second track corresponding to said second and third sections of said first track, and recording said second signal upon sections of said third track corresponding to said first and fourth sections of said first track;

playing back said first through fourth sections of said first track using a playback apparatus to obtain a playback signal; and measuring said level of crosstalk noises as a level of a beat component contained in said playback signal produced between first and second signals.

* * * * *